United States Patent
Min

(10) Patent No.: US 9,735,452 B2
(45) Date of Patent: Aug. 15, 2017

(54) APPARATUS AND METHOD FOR MONITORING COMPONENT BREAKDOWN OF BATTERY SYSTEM

(71) Applicants: Hyundai Motor Company, Seoul (KR); Kia Motors Corporation, Seoul (KR)

(72) Inventor: Kyung In Min, Gyeonggi-do (KR)

(73) Assignees: Hyundai Motor Company, Seoul (KR); Kia Motor Company, Seoul (KR)

(*) Notice: Subject to any disclaimer, the term of this patent is extended or adjusted under 35 U.S.C. 154(b) by 415 days.

(21) Appl. No.: 14/445,734

(22) Filed: Jul. 29, 2014

(65) Prior Publication Data
US 2015/0160077 A1    Jun. 11, 2015

(30) Foreign Application Priority Data

Dec. 5, 2013   (KR) .......................... 10-2013-0150417

(51) Int. Cl.
*H01M 10/48*      (2006.01)
*G01K 3/10*       (2006.01)
(Continued)

(52) U.S. Cl.
CPC .......... *H01M 10/486* (2013.01); *B60L 1/003* (2013.01); *B60L 3/0046* (2013.01); *B60L 3/0061* (2013.01); *B60L 3/04* (2013.01); *B60L 3/12* (2013.01); *B60L 11/1874* (2013.01); *G01K 3/10* (2013.01); *H01M 10/63* (2015.04); *H01M 10/6563* (2015.04); *B60L 2210/40* (2013.01); *B60L 2240/36* (2013.01); *B60L 2240/545* (2013.01);
(Continued)

(58) Field of Classification Search
None
See application file for complete search history.

(56) References Cited

U.S. PATENT DOCUMENTS 5,738,049 A * 4/1998 Ninomiya ................. F01P 5/14
                                                    123/41.15
6,381,406 B1 * 4/2002 Smith ..................... G11B 19/12
                                                      386/327
(Continued)

FOREIGN PATENT DOCUMENTS

JP    2001313092 A  * 11/2001
JP    2002-343449 A    11/2002
(Continued)

*Primary Examiner* — Minh Phan
*Assistant Examiner* — Leon W Rhodes, Jr.
(74) *Attorney, Agent, or Firm* — Mintz Levin Cohn Ferris Glovsky and Popeo, P.C.; Peter F. Corless

(57) ABSTRACT

An apparatus and a method for monitoring a breakdown of a battery system component are provided to more accurately determine whether a cooling fan for cooling a battery of an environment-friendly vehicle or a part related to the cooling fan fails. The method for monitoring a breakdown of a battery system component compulsorily driving, by a controller, the cooling fan and measuring the current temperature of the battery when the battery management system fails to receive a pulse width modulation PWM signal that represents an operation state of the cooling fan and a feedback signal (PFM) of the cooling fan from a cooling fan controller.

10 Claims, 3 Drawing Sheets

(51) Int. Cl.
  *B60L 1/00* (2006.01)
  *B60L 3/00* (2006.01)
  *B60L 3/04* (2006.01)
  *B60L 3/12* (2006.01)
  *B60L 11/18* (2006.01)
  *H01M 10/63* (2014.01)
  *H01M 10/6563* (2014.01)

(52) U.S. Cl.
  CPC ... *B60L 2240/547* (2013.01); *B60L 2240/549* (2013.01); *B60L 2250/10* (2013.01); *B60L 2250/16* (2013.01); *H01M 2220/20* (2013.01); *Y02T 10/7005* (2013.01); *Y02T 10/705* (2013.01); *Y02T 10/7241* (2013.01)

(56) References Cited

U.S. PATENT DOCUMENTS

| | | | |
|---|---|---|---|
| 7,492,129 B2 * | 2/2009 | Aridome | H01M 10/486 320/150 |
| 7,771,864 B2 * | 8/2010 | Kiya | H01M 10/486 429/120 |
| 9,300,017 B2 * | 3/2016 | Cardoso | H01M 10/63 |
| 2008/0297136 A1 * | 12/2008 | Gaboury | B60H 1/00278 324/76.11 |

FOREIGN PATENT DOCUMENTS

| | | | |
|---|---|---|---|
| JP | 2008034246 A * | 2/2008 | |
| JP | 2008-091239 A | 4/2008 | |
| JP | 2008-204962 A | 9/2008 | |
| KR | 10-2010-0063348 A | 6/2010 | |
| KR | 10-2012-0067520 A | 6/2012 | |
| KR | 10-2013-0064381 A | 6/2013 | |

* cited by examiner

APPARATUS AND METHOD FOR MONITORING COMPONENT BREAKDOWN OF BATTERY SYSTEM

CROSS-REFERENCE TO RELATED APPLICATION

This application claims under 35 U.S.C. §119(a) the benefit of Korean Patent Application No. 10-2013-0150417, filed on Dec. 5, 2013, the entire contents of which are incorporated herein by reference.

BACKGROUND (a) Technical Field

The present invention relates to an apparatus and a method for monitoring a component breakdown of a battery system. More particularly, the present invention relates to an apparatus and a method for monitoring a component breakdown of a battery system to more accurately determine whether a cooling fan that cools the battery of an environment-friendly vehicle or a part related to the cooling fan breaks down.

(b) Background Art

A motor that operates as a power source is mounted within environment-friendly vehicles such as a hybrid electric vehicle, an electric vehicle, a fuel cell vehicle, and a battery module that includes a high-voltage battery, that is, a driving power source of the motor and a high-voltage relay for blocking or supplying electric power is mounted within the vehicle.

A battery cooling system that prevents overheating of a battery and a motor cooling system that cools a motor using a coolant to prevent overheating of the motor are essentially mounted within the environment-friendly vehicle. The battery cooling system in an environment-friendly vehicle is used to cool the battery to a predetermined temperature to maintain an optimum performance.

Thereto, a cooling fan motor (hereinafter, referred to as a cooling fan) that radiates heat generated by a battery and a battery management system (BMS) responsible for an overall control such as control of charging and discharging and a temperature of a battery module, including control of an operation and a stage of the cooling fan are mounted to the battery cooling system used in the environment-friendly vehicle. However, when a temperature of a component such as a battery rises due to a breakdown of the cooling fan, a performance of the battery deteriorates and a lifespan of the battery decreases, resulting in restriction or loss of a function of the environment-friendly vehicle. Thus, a breakdown detecting logic for a cooling fan is applied to a battery management system.

In particular, an example of a conventional method related to detection of a breakdown of a cooling fan will be described with reference to FIG. 1. First, when a temperature of a battery rises to a predetermined temperature or greater, the battery management system orders an operation command to the cooling fan. Next, the cooling fan is operated according to a stage commanded by the battery management system, and a current operation situation is transmitted to the battery management system as a pulse width modulation (PWM) signal. In other words, the battery management system determines an operation state of the cooling fan using the PWM signal received from a cooling fan controller.

Then, when the battery management system fails to receive a PWM signal that represents an operation stage of the cooling fan and a feedback signal of the cooling fan from the cooling fan controller, the BMS determines that the cooling fan has failed (e.g., failure or breakdown has occurred). When the breakdown is determined to be due to no receipt of a PWM signal despite a current temperature of the battery being maintained at a reference value or lower, the cooling fan may be replaced, which increases costs due to a wrong determination and causes an operator to visit a repair center due to the same kind of breakdown.

As another exemplary method for solving the problems, a method has been developed in the related art of detecting a breakdown of a cooling fan motor of a battery cooling system, the method including: driving and stopping a cooling fan motor; measuring a voltage across the cooling fan motor after a predetermined time period elapses; and determining that the cooling fan motor is in a normal state when the voltage across the cooling fan motor is greater than a threshold value, and determining that the cooling fan motor fails when the voltage across the cooling fan motor is less than the threshold value.

However, as a breakdown of the cooling fan motor is determined by measuring only a voltage of the cooling fan motor without considering a current temperature of the battery, an error may be generated in determining a breakdown of the cooling fan motor. In other words, since it may be determined that the cooling fan motor is normally operated (e.g., operating without failure) and another component related to the cooling fan motor fails when a current temperature of the battery is maintained at a reference value or lower, whether the cooling fan motor fails may not be accurately determined by the conventional method of measuring a voltage of the cooling fan motor.

SUMMARY

Accordingly, the present invention provides an apparatus and a method for monitoring a breakdown of a battery system component to more accurately determine the breakdown of a cooling fan or a battery management system (BMS) from a current temperature of a battery, by compulsorily driving the cooling fan and measuring the current temperature of the battery when the battery management system fails to receive a PWM signal that represents an operation state of the cooling fan and a feedback signal (PFM) of the cooling fan from a cooling fan controller.

In accordance with an aspect of the present invention, an apparatus for monitoring a breakdown of a battery system component including a battery management system and a cooling fan controller configured to receive a command signal of the battery management system to operate a cooling fan, may include: a compulsory cooling fan driving unit configured to compulsorily drive the cooling fan, when the battery management system fails to receive a PWM signal representing a cooling fan feedback signal (PFM) from the cooling fan controller; a battery temperature measuring unit configured to measure a temperature difference of a battery before and after the cooling fan is compulsorily driven by the compulsory cooling fan driving unit; and a breakdown determining unit configured to determine that the battery management system fails when the temperature difference of the battery measured by the battery temperature measuring unit is a reference value or greater, and configured to determine that the cooling fan fails when the temperature difference is less than the reference value. The apparatus may further include an alarm unit configured to inform a driver of a breakdown of the cooling fan or the battery management system determined by the breakdown determining unit.

In accordance with another aspect of the present invention, a method of monitoring a breakdown of a battery system component, may include: compulsorily driving a cooling fan when a battery management system fails to receive a PWM signal that represents a cooling feedback signal (PFM) from a cooling fan controller; measuring a temperature difference of a battery before and after the compulsory driving of the cooling fan; determining that the battery management system fails when the temperature difference of the battery is a reference value or greater; determining that the cooling fan fails when the temperature difference is less than the reference value.

In compulsorily driving of the cooling fan, the cooling fan may be driven at a maximum stage or sequentially driven at from stage 1 (e.g., a first stage) to the maximum stage (e.g., may be driven at different levels before reaching the maximum level). In measuring the temperature difference of the battery, a temperature of the battery may be measured before the cooling fan is compulsorily driven, and a temperature of the battery may be measured after the cooling fan is compulsorily driven after lapse of about 3 to 10 minutes. The method may further include informing a driver that the cooling fan or the battery management system has failed.

The present invention provides the following effects through the above-described solutions.

First, when the battery management system fails to receive a PWM signal from the cooling fan controller, whether the cooling fan or the battery management system has failed may be more accurately determined based on a temperature difference of the battery before and after the cooling fan is compulsorily driven.

Second, since a driver may more clearly recognize which of the cooling fan and the battery management system has failed, components may be more accurately replaced during a repair process.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Figure 1:
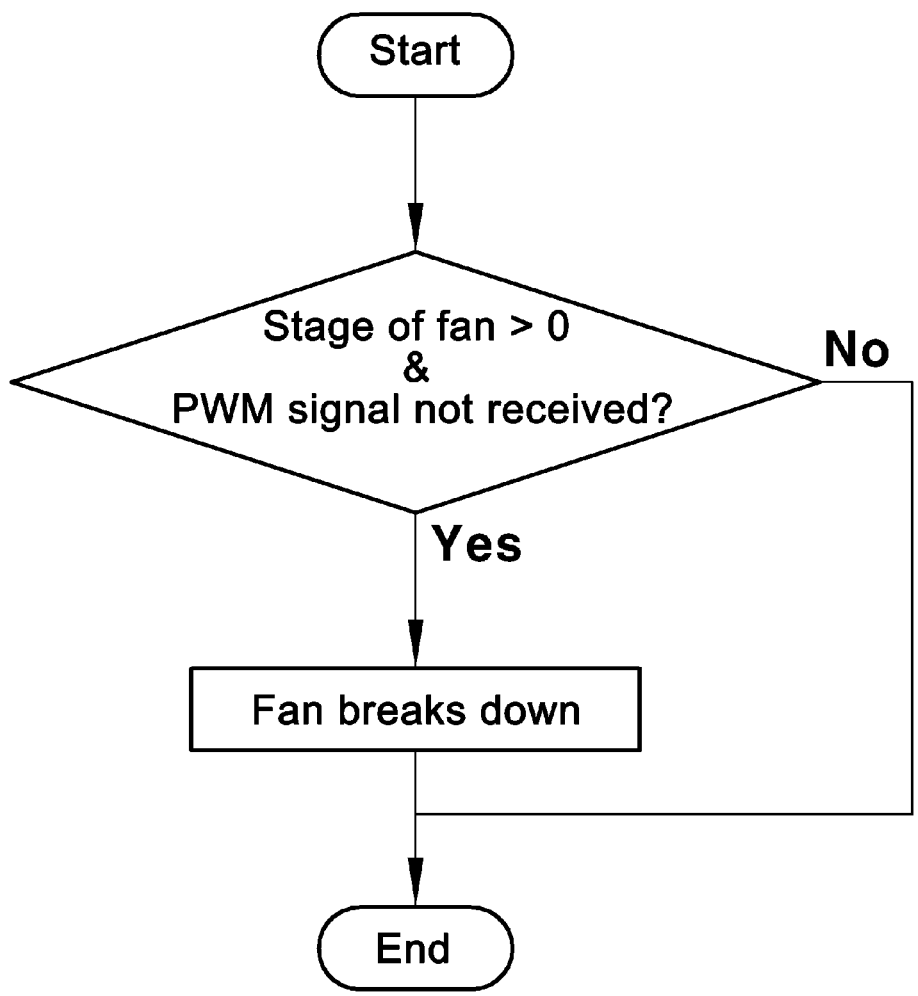
FIG. 1 is an exemplary flowchart showing a method of monitoring a breakdown of a cooling fan of a battery system according to the related art.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings. As described above, a high-voltage battery operating as a power source of a driving motor, a cooling fan that radiates heat generated by the battery and cooling the battery, and a battery management system that operates the cooling fan and the battery are mounted within an environment-friendly vehicle. The main point of the present invention is that whether a cooling fan or a battery management system fails may be more accurately determined when the battery management system fails to receive a PWM signal that represents an operation state of the cooling fan.

Figure 2:
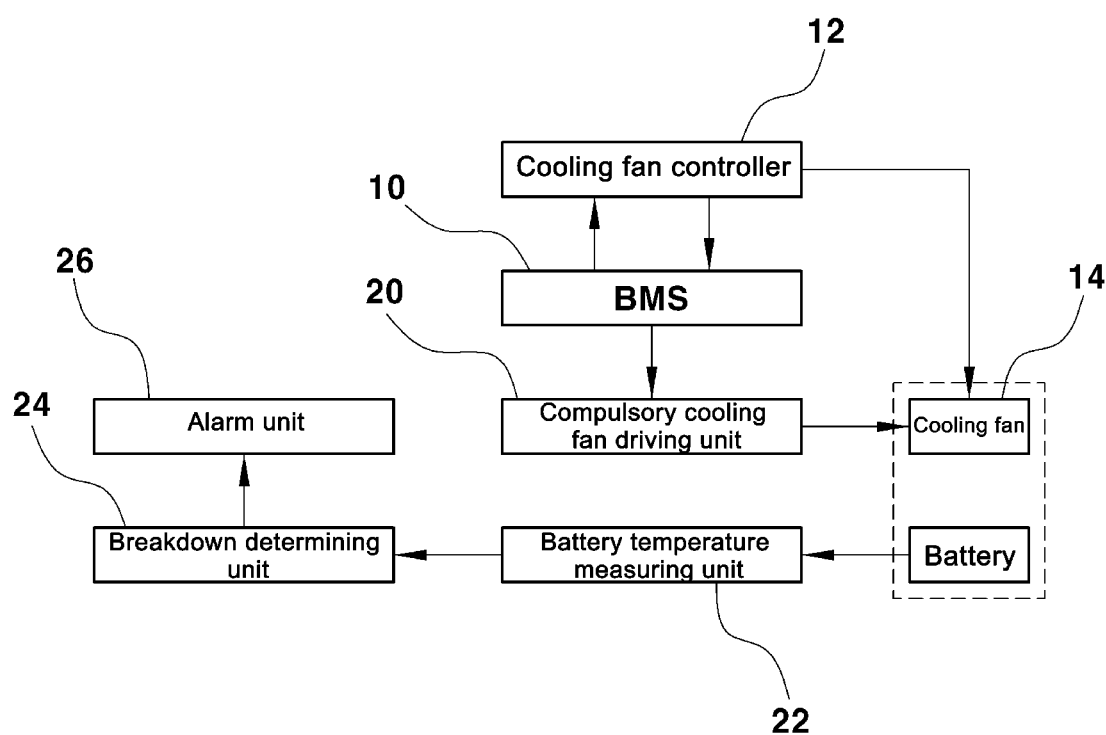
FIG. 2 is an exemplary block diagram showing an apparatus for monitoring a breakdown of a component of a battery system according to an exemplary embodiment of the present invention.
Figure 3:
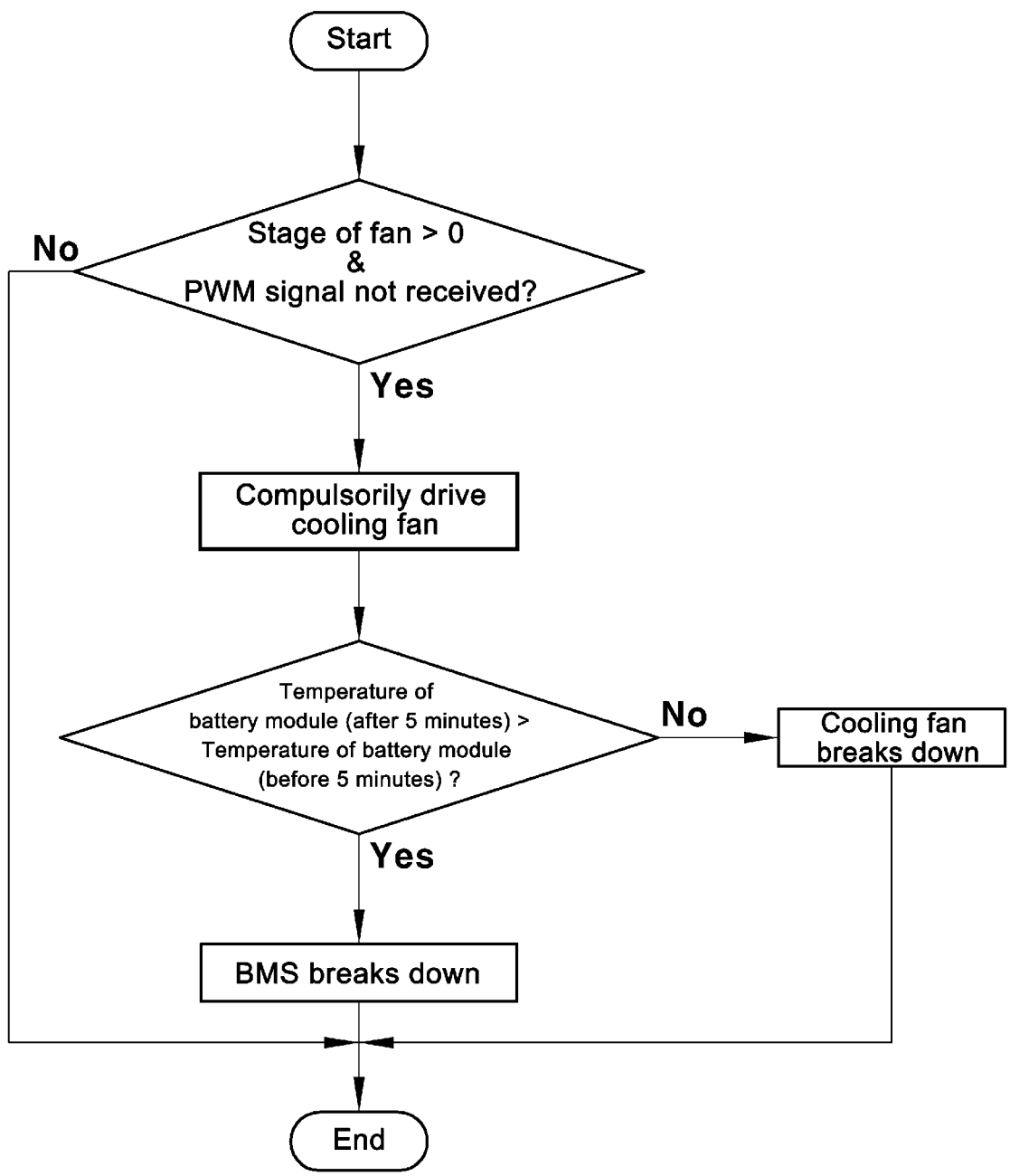
FIG. 3 is an exemplary flowchart showing a method of monitoring a breakdown of a component of a battery system according to an exemplary embodiment of the present invention.

FIG. 2 is an exemplary block diagram showing an apparatus for monitoring a breakdown of a component of a battery system according to an embodiment of the present invention. In particular, the apparatus includes a cooling fan controller 12 and a battery management system 10. The battery management system 10 may include a controller configured to operate a cooling fan 14, a compulsory cooling fan driving unit 20, a battery temperature measuring unit 22, a breakdown determining unit 24, and an alarm unit 26. As shown in FIG. 2, a stage of the cooling fan 14 for cooling a battery may be adjusted under the operation of a cooling fan controller 12 that may be configured to receive a command signal of a battery management system 10. As a feedback signal according to an operation of the cooling fan 14, a cooling fan feedback signal (PFM) including a current operation stage and an operation speed of the cooling fan, that is, a PWM signal may be transmitted from the cooling fan controller 12 to the battery management system 10.

A compulsory cooling fan driving unit 20 for compulsorily driving the cooling fan 14 when the battery management system 10 fails to receive a PWM signal that represents a cooling fan feedback signal (PFM) from a cooling fan controller 12 may be disposed within the battery management system 10 or as a separate control part and may be connected to the battery management system 10 to exchange signals. Accordingly, when the battery management system 10 fails to receive a PWM signal that represents a cooling fan feedback signal (PFM) regarding a current operation stage of the cooling fan 14 from the cooling fan controller 12, the cooling fan 14 may be compulsorily driven by applying a current to the cooling fan 14. Although the cooling fan 14 may be sequentially driven from state 1 up to a maximum stage (e.g., stage 9) during compulsorily driving of the cooling fan 14, the cooling fan 14 may be compulsorily driven directly to the maximum stage (e.g., stage 9) to more promptly cool the battery.

Then, a battery temperature measuring unit 22 may be configured to measure a temperature of the battery before and after the cooling fan 14 is compulsorily driven. The battery temperature measuring unit 22 may be configured to measure a battery temperature that is different before and after the cooling fan 14 is compulsorily driven by the compulsory cooling fan driving unit 20. Additionally, the battery temperature measuring unit 22 may be configured to measure a temperature of the battery before the cooling fan is compulsorily driven, measure a temperature of the battery after the cooling fan is compulsorily driven after lapse of about 3 to 10 minutes, and transmit the temperature of the battery to a breakdown determining unit 24.

Furthermore, the breakdown determining unit 14 may be configured to calculate a temperature difference of the battery measured by the battery temperature measuring unit 22 before and after the compulsory cooling of the cooling fan to determine a breakdown of the cooling fan or the battery management system. The breakdown determining unit 24 may be disposed within the battery management system 10 or as a separate control part, and may be connected to the battery management system 10 to exchange signals. Thus, the breakdown determining unit 24 may be configured to calculate a temperature difference of the battery before and after the cooling fan is compulsorily driven, and when the temperature difference is a reference value or greater, the breakdown determining unit 24 may be configured to determine that the cooling fan 14 is in a normal state (e.g., no failure) and the battery management system 10 has failed.

In other words, since a temperature difference of the battery before and after the cooling fan is compulsorily driven means that the battery is cooled by cool air generated by the cooling fan, the cooling fan may be determined to be in a normal state. Further, since the battery management system fails to receive a PWM signal that represents a feedback signal (PFM) from the cooling fan controller may mean that the battery management system may be experiencing a failure.

Moreover, the breakdown determining unit 24 may be configured to calculate a temperature difference of the battery before and after the cooling fan is compulsorily driven, and when the temperature difference is a reference value or less, the battery management system 10 may be determined to be in a normal state and the cooling fan 14 may simultaneously be determined to have failed. In other words, even when the battery management system fails to receive a PWM signal that represents a feedback signal (PFM) from the cooling fan controller, a breakdown of the cooling fan may be determined as the operation of cooling the battery by the cooling fan is regarded as not being smoothly performed when the temperature difference of the battery before and after the cooling fan is compulsorily driven.

Additionally, the apparatus of the present invention may further include an alarm unit 26 configured to inform a driver of a breakdown of the cooling fan or the battery management system determined by the breakdown determining unit 24. An example of the alarm unit may be an alarm lamp disposed at a cluster of the vehicle. Thus, in response to determining that the cooling fan or the battery management system has failed, the driver may be more accurately informed in regards to the failure of the cooling fan and the battery management system.

What is claimed is:

1. An apparatus for monitoring a breakdown of a battery system component, comprising:
   a battery management system; and
   a cooling fan controller configured to receive a command signal of the battery management system to operate a cooling fan,
   wherein the controller is configured to:
      compulsorily drive the cooling fan when the battery management system fails to receive a pulse width modulation (PWM) signal that represents a cooling fan feedback signal from the cooling fan controller;
      operate a sensor to measure a temperature difference of a battery before and after the cooling fan is compulsorily driven;
      determine a failure of the battery management system when the temperature difference of the battery measured by the battery temperature measuring unit is a reference temperature or greater; and
      determine a failure of the cooling fan when the temperature difference is less than the reference temperature.

2. The apparatus of claim 1, wherein the cooling fan controller is further configured to:
   inform a driver of the determined failure of the cooling fan or the battery management system.

3. A method of monitoring a breakdown of a battery system component, the method comprising:
- compulsorily driving, by a controller, a cooling fan when a battery management system fails to receive a pulse width modulation (PWM) signal that represents a cooling feedback signal from a cooling fan controller;
- measuring, by the controller, a temperature difference of a battery before and after the compulsory driving of the cooling fan;
- determining, by the controller, a failure of the battery management system when the temperature difference of the battery is a reference temperature or greater; and
- determining, by the controller, a failure of the cooling fan when the temperature difference is less than the reference temperature.

4. The method of claim 3, wherein in compulsorily driving the cooling fan, the cooling fan is driven at a maximum stage or sequentially driven at from a first stage to the maximum stage.

5. The method of claim 3, wherein in measuring the temperature difference of the battery, a temperature of the battery is measured before the cooling fan is compulsorily driven, and a temperature of the battery is measured after the cooling fan is compulsorily driven after a lapse of about 3 to 10 minutes.

6. The method of claim 3, further comprising:
- informing, by the controller, a driver of the determined failure of the cooling fan or the battery management system.

7. A non-transitory computer readable medium containing program instructions executed by a controller, the computer readable medium comprising:
- program instructions that operate a controller to compulsorily drive a cooling fan when a battery management system fails to receive a pulse width modulation (PWM) signal that represents a cooling feedback signal from a cooling fan controller;
- program instructions that operate a sensor to measure a temperature difference of a battery before and after the compulsory driving of the cooling fan;
- program instructions that operate the controller to determine a failure of the battery management system when the temperature difference of the battery is a reference temperature or greater; and
- program instructions that operate the controller to determine a failure of the cooling fan when the temperature difference is less than the reference temperature.

8. The non-transitory computer readable medium of claim 7, wherein in compulsorily driving the cooling fan, the cooling fan is driven at a maximum stage or sequentially driven at from a first stage to the maximum stage.

9. The non-transitory computer readable medium of claim 7, wherein in measuring the temperature difference of the battery, a temperature of the battery is measured before the cooling fan is compulsorily driven, and a temperature of the battery is measured after the cooling fan is compulsorily driven after a lapse of about 3 to 10 minutes.

10. The non-transitory computer readable medium of claim 7, further comprising:
- program instructions that operate the controller to output an alarm to a driver of the determined failure of the cooling fan or the battery management system.

* * * * *